United States Patent
Roger et al.

(10) Patent No.: US 10,502,824 B2
(45) Date of Patent: Dec. 10, 2019

(54) FREQUENCY MODULATION SCHEME FOR FMCW RADAR

(71) Applicant: Infineon Technologies AG, Neubiberg (DE)

(72) Inventors: Andre Roger, Munich (DE); Ygnace Romain, Brunnthal (DE); Farhan Bin Khalid, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 304 days.

(21) Appl. No.: 15/342,186

(22) Filed: Nov. 3, 2016

(65) Prior Publication Data

US 2017/0131394 A1    May 11, 2017

Related U.S. Application Data

(60) Provisional application No. 62/252,725, filed on Nov. 9, 2015.

(51) Int. Cl.
*G01S 13/34* (2006.01)
*G01S 7/02* (2006.01)
*G01S 7/35* (2006.01)

(52) U.S. Cl.
CPC .......... *G01S 13/343* (2013.01); *G01S 7/023* (2013.01); *G01S 7/35* (2013.01); *G01S 13/931* (2013.01)

(58) Field of Classification Search
CPC .......... G01S 13/343; G01S 7/023; G01S 7/35
See application file for complete search history.

(56) References Cited

U.S. PATENT DOCUMENTS

| 6,037,894 A | 3/2000 | Pfizenmaier et al. |
| 7,408,499 B2 * | 8/2008 | Szajnowski ............. G01S 7/282 340/435 |
| 7,570,196 B1 * | 8/2009 | Mower ................... G01S 7/006 342/159 |
| 7,956,799 B2 | 6/2011 | Spreadbury |
| 8,150,325 B1 * | 4/2012 | Prichard ................ H04B 1/525 324/691 |
| 8,599,062 B2 | 12/2013 | Szajnowski |
| 9,194,946 B1 | 11/2015 | Vacanti |
| 9,244,164 B2 | 1/2016 | Luebbert |

(Continued)

FOREIGN PATENT DOCUMENTS

| CN | 104794264 A | 7/2015 |
| JP | H0472588 A | 3/1992 |

(Continued)

OTHER PUBLICATIONS

European Search Report dated Mar. 14, 2017 for European Application No. EP 16 19 8004.
Candes, Emmaneul et al. "Robust Uncertainty Principles: Exact Signal Reconstruction from Highly Incomplete Information," IEEE Trans. on Information Theory, vol. 52, No. 2, Feb. 2006, 41 pages.
Herman, Matthew A. et al. "High-Resolution Radar via Compressed Sensing," IEEE Transactions on Signal Processing, vol. 57, No. 6, Jun. 2009, pp. 2275-2284.

(Continued)

*Primary Examiner* — Marcus E Windrich
(74) *Attorney, Agent, or Firm* — Eschweiler & Potashnik, LLC

(57) ABSTRACT

A method for a radar transmitter is described herein. In accordance with one exemplary embodiment, the method includes generating an RF transmit signal composed of at least one sequence of sub-sequent chirp pulses, wherein pseudo-randomly selected chirp pulses are blanked, and radiating the RF transmit signal via at least one antenna as radar signal.

28 Claims, 5 Drawing Sheets

(56) References Cited

U.S. PATENT DOCUMENTS

| | | | |
|---|---|---|---|
| 9,720,080 B1* | 8/2017 | Rodenbeck | G01S 13/86 |
| 2003/0193430 A1 | 10/2003 | Gresham | |
| 2010/0245154 A1* | 9/2010 | Szajnowski | G01S 7/023 |
| | | | 342/90 |
| 2011/0122014 A1* | 5/2011 | Szajnowski | G01S 7/023 |
| | | | 342/109 |
| 2011/0291875 A1* | 12/2011 | Szajnowski | G01S 7/023 |
| | | | 342/70 |
| 2012/0313810 A1* | 12/2012 | Nogueira-Nine | G01S 7/354 |
| | | | 342/128 |
| 2014/0111366 A1* | 4/2014 | Ginsburg | G01S 7/282 |
| | | | 342/21 |
| 2016/0061942 A1* | 3/2016 | Rao | G01S 7/35 |
| | | | 342/109 |
| 2016/0327633 A1* | 11/2016 | Kumar Y.B. | H01C 223/00 |

FOREIGN PATENT DOCUMENTS

| | | |
|---|---|---|
| JP | 2013029420 A | 2/2013 |
| KR | 20150100395 A | 9/2015 |

OTHER PUBLICATIONS

Osher, Stanley et al. "Sparse Recovery via L1 and L1 Optimization." UCLA CAM Report 14-82, Nov. 2014, pp. 1-9.

Cai, T. Tony et al. "Orthogonal Matching Pursuit for Sparse Signal Recovery with Noise," IEEE Transactions on Information Theory, vol. 57, No. 7, Jul. 2011, pp. 4680-4688.

Davenport, Mark A. et al. "Introduction to Compressed Sensing." Compressed-Sensing: Theory and Applications, Cambridge University Press, 2012, pp. 1-68.

Tropp, Joel A. et al. "Signal Recovery From Random Measurements via Orthogonal Matching Pursuit." IEEE Transactions on Information Theory, vol. P53, Issue: 12, Dec. 2007, pp. 1-9.

Wu, Dalei et al. "The Theory of Compressive Sensing Matching Pursuit Considering Time-domain Noise with Application to Speech Enhancement." IEEE/ACM Transactions on Audio, Speech, and Language Processing, vol. 22, No. 3, Mar. 2014, pp. 682-696.

* cited by examiner

FREQUENCY MODULATION SCHEME FOR FMCW RADAR

REFERENCE TO RELATED APPLICATIONS

This application claims the benefit of U.S. Provisional Application No. 62/252,725 filed Nov. 9, 2015, entitled "FREQUENCY MODULATION SCHEME FOR FMCW RADAR", the contents of which are herein incorporated by reference in their entirety.

FIELD

The invention relates to the field of radar sensors. In particular to a novel modulation scheme for frequency-modulated continuous-wave (FMCW) radar sensors.

BACKGROUND

Radio frequency (RF) receivers and transceivers can be found in numerous applications, particularly in the field of wireless communications and radar sensors. In the automotive sector, there is an increasing demand for radar sensors used in so-called "adaptive cruise control" (ACC) or "radar cruise control" systems. Such systems may be used to automatically adjust the speed of an automobile so as to maintain a safe distance from other automobiles ahead.

As in many applications, in which electronic circuits are used, energy consumption and heat dissipation may also be an issue for radar sensors, which are used for measuring distance and velocity of objects (so-called radar targets) present in the "field of view" of the radar sensor. Modern radar systems make use of highly integrated RF circuits (monolithic microwave integrated circuits, MMIC), which may incorporate all core functions of an RF font-end of a radar transceiver in one single package (single chip transceiver). Such RF front-ends usually include, inter alia, a voltage controlled oscillator (VCO), power amplifiers (PA), mixers, and analog-to-digital converters (ADC). As a result of the progress, which has been made in integrating RF circuitry, the problem of heat dissipation becomes even more preeminent. Another problem may result from cross-talk between radar sensors operating in close vicinity to each other (e.g. two automobiles driving side by side, each having a radar sensor).

There is a general need for radar sensors which have an improved (i.e. reduces) energy consumption and generate less heat during operation. Furthermore, a reduction of cross-talk may be desirable.

SUMMARY

A transmitter circuit for a FMCW radar sensor is described herein. In accordance with one exemplary embodiment, the transmitter circuit includes an RF oscillator that operably generates a frequency-modulated RF transmit signal, wherein the RF transmit signal is composed of at least one sequence of consecutive chirp pulses, in which randomly selected chirps pulses are blanked.

Furthermore, a method for a radar transmitter is described herein. In accordance with one exemplary embodiment, the method includes generating an RF transmit signal composed of at least one sequence of consecutive chirp pulses, in which randomly selected chirp pulses are blanked, and radiating the RF transmit signal via at least one antenna as radar signal.

BRIEF DESCRIPTION OF THE DRAWINGS

The invention can be better understood with reference to the following description and drawings. The components in the figures are not necessarily to scale, emphasis instead being placed upon illustrating the principles of the invention. Moreover, in the figures, like reference numerals designate corresponding parts. In the drawings:

FIG. 5c illustrate a corresponding pseudo-random binary sequence.

DETAILED DESCRIPTION

Embodiments of the present invention are discussed below in the context of a radar transceiver. It should be noted, however, that the present invention may also be applied in applications different from radar such as, for example, RF transceivers of RF communication devices. Before discussing details of the frequency modulation (FM) scheme used by the radar sensors described herein, the general structure of a FMCW radar transceiver is explained.

Figure 1:
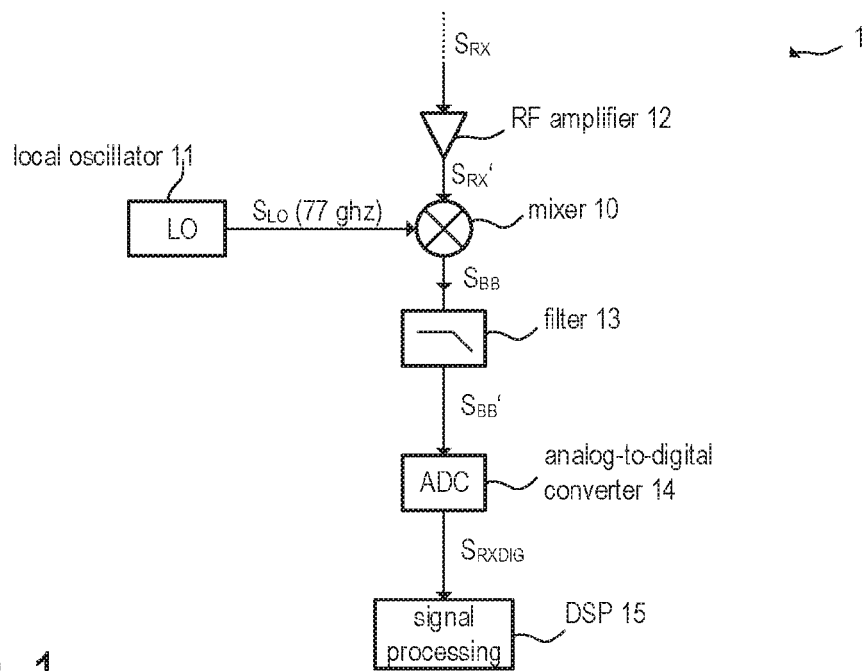
FIG. 1 is a block diagram illustrating the basic structure of the receive path of a RF transceiver chip.

FIG. 1 illustrates the receive path of an RF transceiver 1 as used, for example, in a radar distance and/or velocity measurement device also referred to as "radar sensor". Accordingly, the RF transceiver 1 includes a mixer 10 which is supplied with an RF input signal $S_{RX}$ and an RF oscillator signal $S_{LO}$, used to down-convert the RF input signal $S_{RX}$ into the base band or an intermediate frequency (IF) band. The RF input signal $S_{RX}$ may be provided by an antenna (not shown in FIG. 1) and may be pre-amplified (see RF amplifier 12, e.g. a low noise amplifier, LNA) before being supplied to the mixer 10. In the present example, the RF oscillator signal $S_{LO}$ is generated by a local oscillator (LO) 11, which may include a voltage controlled oscillator (VCO) coupled in a phase locked loop (PLL). However, the RF oscillator signal $S_{LO}$ may be provided by other circuitry dependent on the actual application. In radar applications the local oscillator signal $S_{LO}$ is usually frequency modulated to implement a so-called FMCW radar sensor. When used in a radar distance and/or velocity measurement device, the RF oscillator signal $S_{LO}$ may be in the range between approximately 24 GHz and 81 GHz (77 GHz in the present example). However, higher or lower frequencies may also be applicable. Some aspects of the frequency modulation are explained further below with reference to FIG. 3.

As mentioned, the mixer 10 down-converts the RF input signal $S_{RX}'$ (amplified antenna signal) into the base band (or the IF band). The respective base band signal (mixer output signal) is denoted by $S_{BB}$. The base band signal $S_{BB}$ (or IF band signal) is then subject to analog filtering (filter 13) to suppress undesired sidebands or image frequencies. The filter 13 may be a low-pass filter or a band-pass filter. The filtered base band signal (filter output signal) is denoted by $S_{BB}'$ and also referred to as "beat signal" in FMCW radar applications. Receivers, which make use of a mixer to down-convert the RF input signal into the base band or an IF band are as such known as heterodyne receivers and thus not further discussed in more detail. The filtered base band signal $S_{BB}'$ is then sampled and converted to a digital signal $S_{RXDIG}$ (analog-to-digital converter 14), which is then further processed in the digital domain using a digital signal processor (e.g. DSP 15). In case of a down-conversion into an IF band, the IF signal may also be digitized for a digital demodulation of the IF signal. The digital signal processing may be performed using, e.g., a digital signal processor executing appropriate software instructions.

Figure 2:
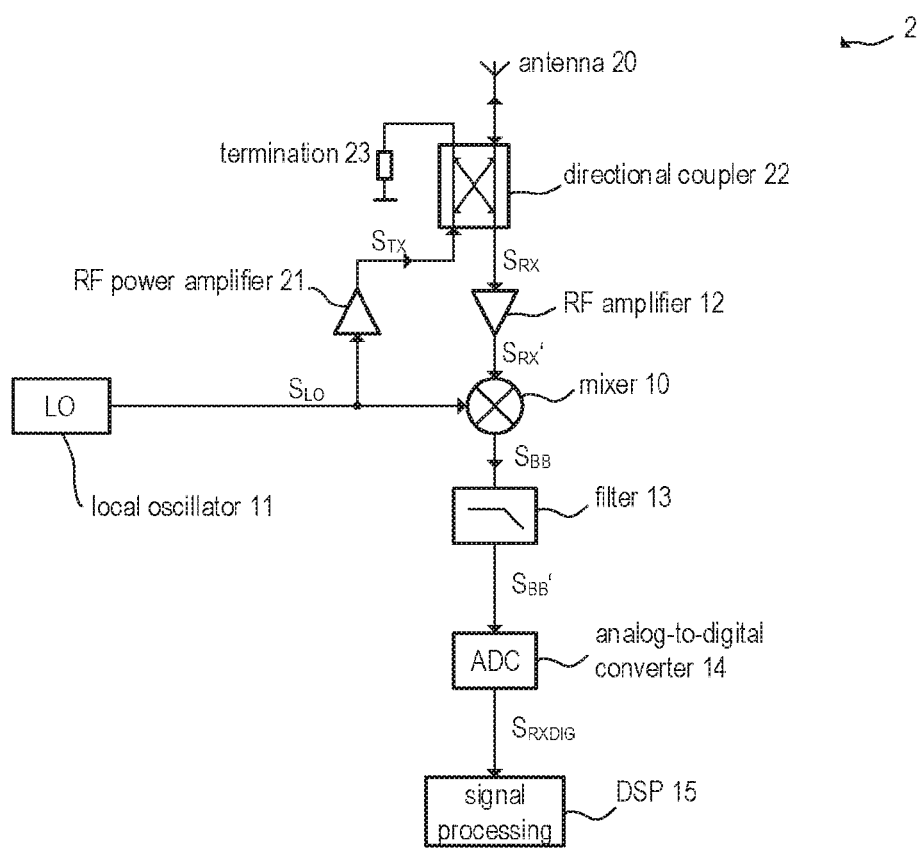
FIG. 2 is a block diagram illustrating the receive/transmit path in a monostatic radar transceiver chip.

FIG. 1 illustrates the receive path of an RF receiver or transceiver. In so-called bistatic or pseudo-monostatic radar systems, the receiver may be separate from the transmitter as receiver and transmitter use separate antennas. Antenna arrays may be used instead of single antennas FIG. 2 illustrates a RF transceiver (combined receiver and transmitter), which may be used in a monostatic radar system, in which the same antenna is used to transmit and receive RF signals. The transceiver of FIG. 2 includes a directional coupler 22, which is coupled between the mixer 10 and an antenna 20 and configured to direct the RF signal $S_{RX}$, received by the antenna 20 to the mixer 10 (receive path). Before being radiated by the antenna 20, the RF oscillator signal $S_{LO}$ is amplified by an RF power amplifier 21. The amplified RF oscillator signal is denoted as $S_{TX}$ and also referred to as outgoing "radar signal". The directional coupler 22 is configured to direct the amplified RF oscillator signal $S_{TX}$ to the antenna 20, which radiates a respective electromagnetic radar signal. Besides the directional coupler 22, the receive path (amplifier 12, mixer 10, filter 13, analog-to-digital converter 14, signal processor 15) is the same as in FIG. 1 and thus not repeated here.

The directional coupler 22 may be implemented as rat-race coupler formed by strip lines. However, other types of directional couplers may be used. Particularly when using a rat race coupler, one port of the coupler is terminated by a termination impedance 23. The directional coupler 22 may be implemented in the same chip package as the other circuit components of the transceiver to provide a single chip solution. Dependent on the actual implementation, a circulator may be used as an alternative to the directional coupler 22. A so-called "single chip radar" may usually include circuitry providing the core functions needed for distance and/or velocity measurement in one chip (monolithic microwave integrated circuit, MMIC). Thus the chip may include, inter alia, RF oscillators, amplifiers, mixers, filters, analog-to-digital converters, and digital signal processors. However, for the embodiments described herein, integration is not of specific importance, and solutions composed of several separate chips and discrete circuit components are also applicable.

Figure 3:
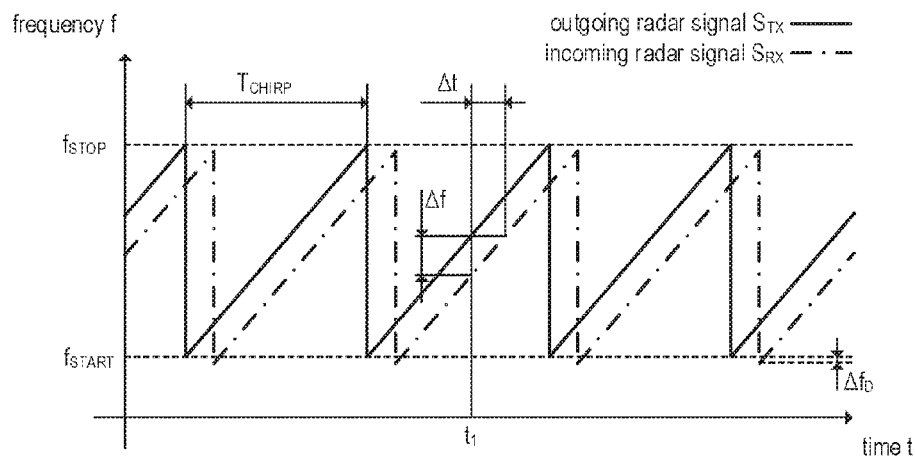
FIG. 3 illustrates a frequency modulation scheme which can be used in FMCW radar sensors.

As mentioned above, a frequency modulated continuous-wave radar (FMCW) signal is used for distance measurements by the radar sensor as shown, for example, in FIG. 2. Dependent on the application, various kinds of frequency modulation (FM) schemes may be used. The radar signal may be frequency modulated in accordance with a sine waveform, a sawtooth waveform, a triangular waveform, or the like. In many applications the modulation signal used for frequency modulation of the radar signal has a triangular wave form or a sawtooth waveform. FIG. 3 illustrates the measurement principle used by a FMCW radar sensor that radiates a frequency modulated radar signal, which is modulated using a sawtooth-shaped modulation signal. The diagram of FIG. 3 illustrates the frequency over time of the outgoing radar signal $S_{TX}$ and the respective incoming radar signal $S_{RX}$ (see also FIG. 2). Accordingly, the frequency of the outgoing radar signal $S_{TX}$ linearly increases from a start frequency $f_{START}$ to a stop frequency $f_{STOP}$, then falls back to $f_{START}$ and again increases until the stop frequency $f_{STOP}$ is reached, and so on. As can be seen from FIG. 3 the outgoing radar signal $S_{TX}$ is composed of a sequence of "frequency ramps" also referred to as "chirp pulses" or "chirps". Dependent on the application a defined modulation pause may be inserted between two subsequent chirps, wherein the radar signal may remain at the stop frequency or the start frequency during the pause (or any frequency between stop and start frequency). The duration of one chirp may be in the range from a few microseconds up to a few milliseconds, e.g. 50 µs to 2000 µs. The actual values may be, however, greater or lower dependent on the application.

The incoming radar signal $S_{RX}$ (received by the antenna) lags with respect to the outgoing radar signal $S_{TX}$ (radiated by the antenna) by a time lag $\Delta t$ due to the travel time of the radar signal from the antenna to the radar target (at which the radar signal is back-scattered) and back to the antenna. The time lag $\Delta t$ is often referred to as round trip delay RTD. The distance $d_T$ of the radar target from the radar sensor is $d_T = c \cdot \Delta t/2$, i.e., the speed of light c times half of the time lag $\Delta t$. As can be seen from FIG. 3, the time lag $\Delta t$ results in a frequency shift $\Delta f$, which can be measured by down-mixing the incoming signal $S_{RX}$ (see FIG. 2, mixer 10 and filter 13) and subsequent digital spectral analysis. When using a linear chirp as shown in FIG. 3 (i.e. a sawtooth-shaped modulation signal) the time lag $\Delta t$ can be calculated as $\Delta t = \Delta f/k$, wherein the factor k is the steepness of the frequency ramp, which can be calculated as $k = (f_{STOP} - f_{START})/T_{CHIRP}$.

Although the basic operation principle of a FMCW radar sensor has been outlined above, it should be noted that more sophisticated signal processing can be applied in practice. In particular an additional frequency shift $f_D$ of the incoming signal due to the Doppler effect may cause an error in the distance measurement because the Doppler shift $f_D$ adds to the frequency shift $\Delta f$, which is due to the travel time of the radar signal as explained above. Dependent on the application the Doppler shift may also be estimated from the outgoing and incoming radar signals, and in some application the Doppler shift may be negligible for distance measurement. This may be particular the case, when the chirp duration $T_{CHIRP}$ is short, so that the frequency shift $\Delta f$ is high as compared with the Doppler shift $f_D$ for any distance within the measuring range of the radar sensor. In the example of FIG. 3 the frequency of the radar signal increases from $f_{START}$ to $f_{STOP}$, which results in a so-called "up-chirps". However, the same measurement techniques can be applied with "down-chirps", that is when the stop frequency $f_{STOP}$ is lower than the start frequency $f_{START}$ and the frequency decreases from $f_{START}$ to $f_{STOP}$ during a chirp. In some radar systems, the Doppler shift may be eliminated, when the distance is calculated based on an "up-chirp" and on a "down-chirp". The actually measured distance $d_T$ of a radar target can be calculated as the average of a distance value obtained from the up-chirp echo and a distance value obtained from the down-chirp echo; by the averaging the Doppler shift cancels out. However, these basic signal processing techniques are as such known in the field of FMCW radars and are thus not explained here in more detail.

Figure 4:
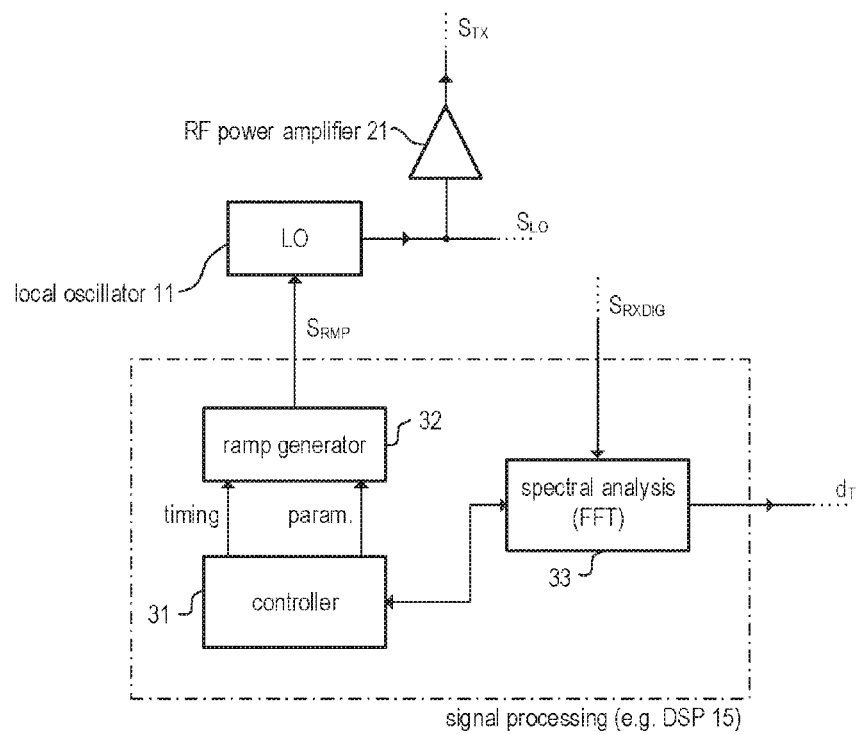
FIG. 4 is a block diagram illustrating some aspects of the signal processing for measuring distance and/or velocity of a radar target.

FIG. 4 is a block diagram illustrating the basic signal processing structure, which may be used to implement the FM scheme shown in FIG. 3 and the evaluation of the frequency shift Δf included in the down-mixed and digitized radar signal $S_{RXDIG}$ (cf. FIG. 2). The signal processing structure depicted in FIG. 4 may be at least partly implemented by software, which is executed by one or more microprocessors (e.g. a digital signal processor, a microcontroller or the like). Some functions may, nevertheless, be implemented using dedicated hardware such as programmable or hard-wired logic circuits. Accordingly, the signal $S_{RXDIG}$ (digital FMCW radar signal), which includes a frequency component (beat frequency) equal to the frequency shift Δf, is subjected to a spectral analysis (block 33, spectral processing unit) to determine the frequency shift Δf and the respective distance value $d_T$ representing the distance of a radar target from the radar sensor. A ramp generator 32 is used to generate a ramp signal $S_{RMP}$ for controlling the oscillation frequency of the local oscillator 11 (cf. FIG. 2). The ramp signal $S_{RMP}$ represents the frequency ramps shown in FIG. 3 and is used to set the oscillation frequency of the local oscillator 11. The local oscillator 11 may be a voltage controlled oscillator (in this case the ramp signal $S_{RMP}$ is a voltage signal) or a phase locked loop (PLL) including a voltage controlled oscillator and a frequency divider with an adjustable frequency division ratio (in this case the ramp signal $S_{RMP}$ may be a sequence of frequency division ratios). The RF oscillator signal $S_{LO}$ (output signal of the PLL) may be modulated by appropriately modulating the frequency division ratio of the frequency divider in the PLL. However, PLLs for generating the modulated RF oscillator signal $S_{LO}$ are as such known and therefore not further explained herein. A controller 31 is used to control the timing of the signal processing (spectral analysis, block 33) and the ramp generation (ramp generator 33). The controller 31 may further be configured to control the signal flow and to set the parameters (start and stop frequencies $f_{START}$, $f_{STOP}$, chirp duration, etc.) used for the ramp generation. The controller 31 may also be configured to enable and disable the RF oscillator 11 in order to stop or pause the generation of chirp pulses in the RF oscillator signal $S_{LO}$.

Figure 5:
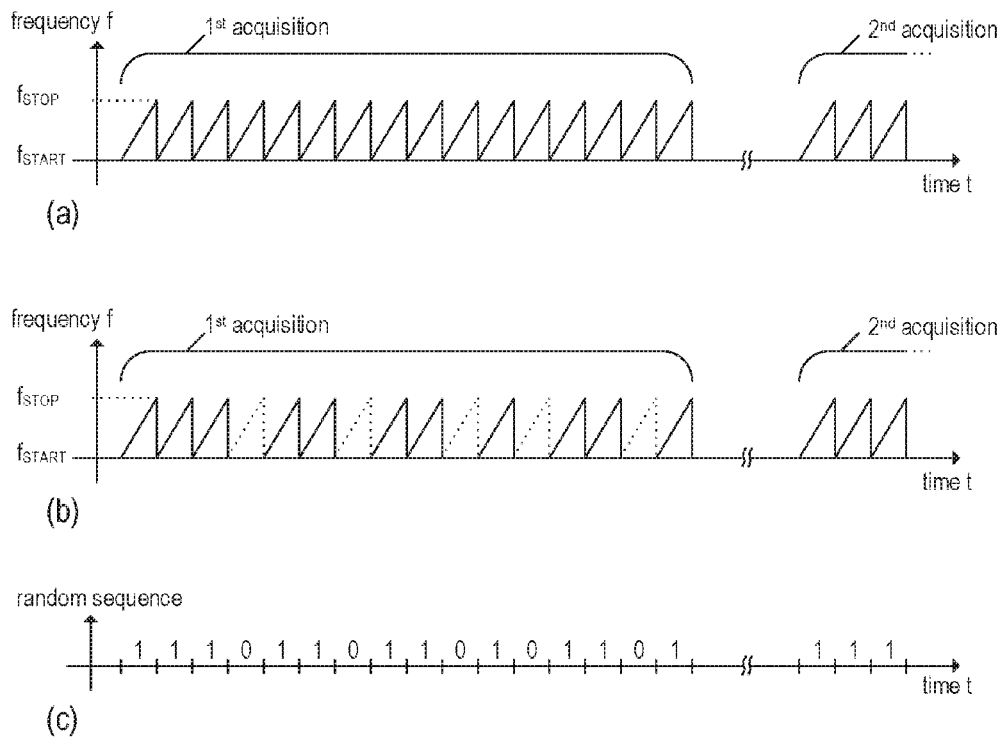
FIGS. 5a to 5c illustrate the frequency modulation scheme of a FMCW radar transmitter/transceiver (FIG. 5a) and the omission of individual chirps in accordance with the present disclosure (FIG. 5b)

During operation of a radar sensor, a sequence composed of a defined number of chirps is radiated (outgoing radar signal) and the resulting radar echo (incoming radar signal) is processed as explained above. In practice, a sequence includes a large number of subsequent chirps, e.g. 128 chirps. Each chirp contributes to the heat dissipation in the RF frontend of the radar transceiver, particularly in the RF power amplifier (cf. FIG. 2, amplifier 21). It has been found that the amount of energy dissipated in the radar transmitter (particularly in the RF frontend of the radar transmitter, e.g. in the power amplifier 21 in the example of FIG. 2) can be significantly reduced without losing information. This can be accomplished by randomly omitting individual chirps (frequency ramps) of a sequence of chirps (cf. FIG. 3) and applying the theoretical principles of compressed sensing (also known as compressive sensing, sparse sensing, compressive sampling and sparse sampling). This situation is illustrated by the timing diagrams of FIGS. 5a and 5b. The timing diagram of FIG. 5a illustrates an exemplary FM scheme as usually implemented in FMCW radar systems. In the present example, a sequence of sixteen up-chirps is transmitted for one data acquisition. It is noted that, in practice, a chirp sequence usually includes much more chirps and the present example has been simplified for illustration purposes only. FIG. 5c illustrates a pseudo-random binary sequence, wherein each number in the sequence is associated with a chirp in the original FM modulation scheme (see FIG. 5a). A chirp in the original sequence of chirps (FIG. 5a) is omitted, when a zero occurs in the pseudo-random binary sequence.

Figure 6:
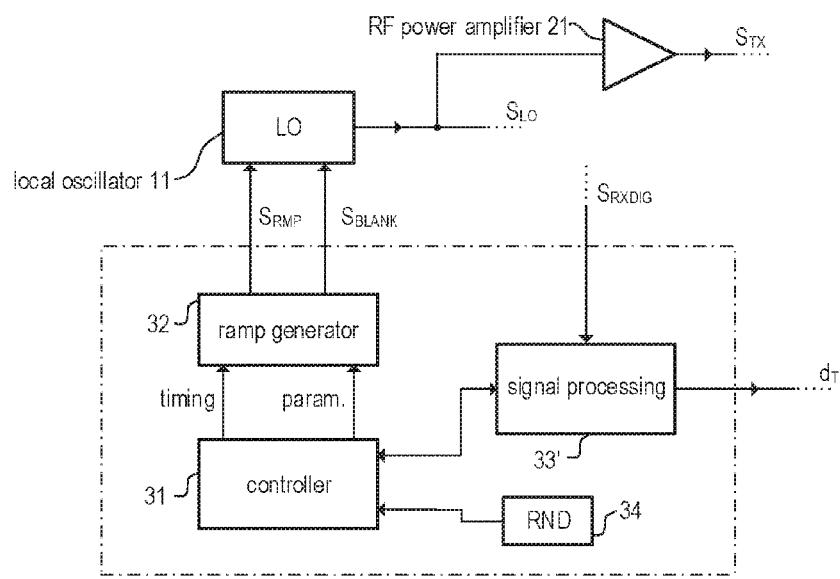
FIG. 6 is a block diagram illustrating some aspects of the signal processing for measuring distance and/or velocity of a radar target when using a sparse chirp sequence as shown in FIG. 5b.

FIG. 6 is a block diagram illustrating the basic signal processing structure, which may be used to implement the FM scheme shown in FIG. 5b. The example of FIG. 6 is essentially identical to the example of FIG. 4 except that an additional random number generator 34 is used to generate a pseudo-random sequence as shown in FIG. 5c and that the processing of the incoming radar signal $S_{RXDIG}$ (digital FMCW radar signal) is adapted to the sparse chirp sequence. In the present example, the random generator 34 provides a sequence of random numbers to the controller 31, which then pauses the generation of a chirp in case a zero occurs in the random sequence. In this context the terms "random number" and "random sequence" include "pseudo-random number" and "sequence of pseudo-random numbers", respectively. That is, in each chirp cycle the ramp generator 32 is only triggered to generate a chirp, when a one occurs in the random sequence for the respective cycle. If no chirp is to be generated, the RF oscillator 11 may be paused, e.g. in response to a blanking signal $S_{BLANK}$. As compared with the previous example of FIG. 4, the signal processing of the incoming radar signal (block 33') is enhanced in order to restore the information, which is "lost" due to randomly omitting of chirps. As mentioned above, the information is not really lost but can be restored under the circumstances discussed further below. Instead of enabling and disabling the RF oscillator 11 in order to blank individual chirp pulses selected from a sequence of consecutive chirp pulses, the RF amplifier may be temporarily disabled to prevent the selected chirp pulses from being amplified and radiated by the antenna.

It is expected that at least one third of the chirp pulses can be omitted without significantly lowering the performance of radar distance and velocity measurement. Dependent on the application and the desired accuracy of the measurement up to 50 percent of the chirp pulses can be omitted. Rough estimations show that even the omission of two third or even more of the chirp pulses could be possible. However, there is a tradeoff between the achievable accuracy and the fraction of chirp pulses omitted in a sequence of M chirp pulses (M may be, for example, 128 or 256). In the further explanations, it is assumed that, in a contiguous sequence of M consecutive chirp pulses, M−K chirp pulses are blanked and only the remaining K chirp pulses are transmitted and radiated to the radar channel (and thus back-scattered to the radar receiver portion of the transceiver).

It is noted that the pseudo-random sequence (cf. FIG. 5c) may be fixed for a specific transceiver or a specific operating mode of the transceiver and set during the design of the transceiver. One or more fixed random sequences may be stored in a memory of the controller 31. Other implementations, however, may actually include a random number generator, so that the (pseudo-) random sequence can be generated on-chip and thus can vary. Algorithms for generating sequences of pseudo-random numbers (e.g. random sequences generated by the controller 31 by executing appropriate software instructions) as well as circuits that are able to generate random sequences (e.g. a linear-feedback shift register) are as such known and thus not further discussed herein.

As mentioned above, in a sequence of chirps to be transmitted by a radar transmitter/transceiver, some chirps can be omitted (i.e. replaced by a transmission pause), while still being able to obtain reliable distance and velocity measurements when applying the principles of compressed sensing. The first rather theoretic contributions in the early 2000s in the area of applied mathematics have suggested that it may be possible to surpass the traditional limits of sampling theory (Nyquist-Shannon sampling theorem). The theory of compressed sensing builds upon the fact that many signals can be represented using only a few non-zero coefficients in a suitable basis or "dictionary". Nonlinear optimization can then enable recovery of such signals from very few measurements. Compressed sensing enables a potentially large reduction in the sampling and memory requirements for acquiring signals that have a sparse or compressible representation resulting in increased computation requirements, however, for processing significantly less data. While the Nyquist-Shannon sampling theorem states that a certain minimum number of samples is required in order to perfectly acquire an arbitrary bandlimited signal, when the signal is sparse in a known basis, however, the number of measurements, which need to be processed, can be significantly reduced. Inspired by data compression techniques such as Transform Coding, Compressed Sensing aims at reducing the number of samples (i.e. "compressed" sampling) instead of sampling at the Nyquist rate and then use data known techniques for compressing/reducing the amount of data. The field of Compressed Sensing grew out of the theoretic work of Candés, Romberg, and Tao (see Candés, Tomberg, Tao, "*Robust Uncertainty Principles: Exact Signal Reconstruction From Highly Incomplete Frequency Information*" in: IEEE Trans. on Information Theory, Vol. 52, No. 2, February 2006), who showed that a finite-dimensional signal having a sparse or compressible representation can be recovered exactly from a small set of linear, non-adaptive measurements. The design of these measurement schemes and their extensions to practical data models and acquisition systems remain central challenges in the field of Compressed Sensing until today.

The classical sampling theory typically considers infinite length, continuous-time signals. In contrast thereto, Compressed Sensing is a mathematical theory focused on measuring finite-dimensional vectors in $\mathbb{R}^n$. Rather than sampling the signal at specific points in time, Compressed Sensing systems typically acquire measurements in the form of inner products between the signal and more general test functions. Randomness may be an important aspect in the design of these test functions. The two frameworks (classical sampling theory and Compressed Sensing) differ in the manner in which they deal with signal recovery, i.e., the problem of recovering the original signal from the compressive measurements. In the Nyquist-Shannon framework, signal recovery is achieved through interpolation based on the sinc-function, which is a linear process that requires little computation and has a simple interpretation. In Compressed Sensing, however, signal recovery is typically achieved using nonlinear methods.

As indicated above, the information included (randomly) omitted chirps is not lost but can be restored by appropriate signal processing, i.e. by applying signal recovery algorithms which make use the principles of "compressed sensing". Many of these algorithms make use of so-called $l_1$ optimization or $L_1$ optimization. Exemplary algorithms, which may be used for signal recovery, are known as Basis Pursuit and Matching Pursuit (MP). Enhancements of MP are known as Orthogonal Matching Pursuit (OMP), Stage-wise Orthogonal Matching Pursuit (StOMP), Compressive Sampling Matching Pursuit (CoSaMP), and Multipath Matching Pursuit (MMP).

The standard signal processing of digital FMCW radar signals (see FIG. 4, signal processing 33, and FIG. 6, signal processing 33') includes the calculation of Range-Doppler Maps (also referred to as Range-Doppler Images). Generally, linear FMCW radars obtain target information (i.e. distance and velocity of a radar targets) by continuously transmitting linear chirps and mixing the delayed echoes from targets with a sample of the transmitted signal (see FIG. 3). The target range information can be extracted from the spectrum of this mixed signal (i.e. from the above-mentioned beat frequency). A Range-Doppler map can be obtained after coherent integration of several chirps. Range-Doppler maps can be used as a basis for various identification and classification algorithms. As mentioned above in connection with FIG. 3, the distance $d_T$ of the radar target from the radar sensor is $$d_T = c \cdot \Delta f \cdot T_{CHIRP}/(2 \cdot B), \tag{1}$$

wherein $\Delta f$ denotes the beat frequency and B the bandwidth of the chirp ($B=|f_{STOP}-f_{START}|$). Accordingly, the basic signal processing of linear FMCW radar is to determine the beat frequency. When the radar target is moving, the Doppler effect has to be considered to determine the information of the radar target's velocity (relative to the radar sensor), which can be done based on the mentioned Range-Doppler maps, which can be calculated using so-called Range-Doppler Processing.

The common method for calculating the Range-Doppler maps is a two-dimensional Fourier Transform, which is usually implemented using a Fast Fourier Transform (FFT) algorithm. Accordingly, a first FFT is applied to the N samples of each chirp to obtain the range information (the beat frequency), and a second FFT is applied to the sequence of samples taken from M consecutive chirps (e.g. the n-th sample of M consecutive chirps, n=0, 2, . . . , N−1) to obtain Doppler information. The result of the Range-Doppler Processing may be organized in a M×N matrix X(m, n) referred to as Range-Doppler map.

Figure 7:
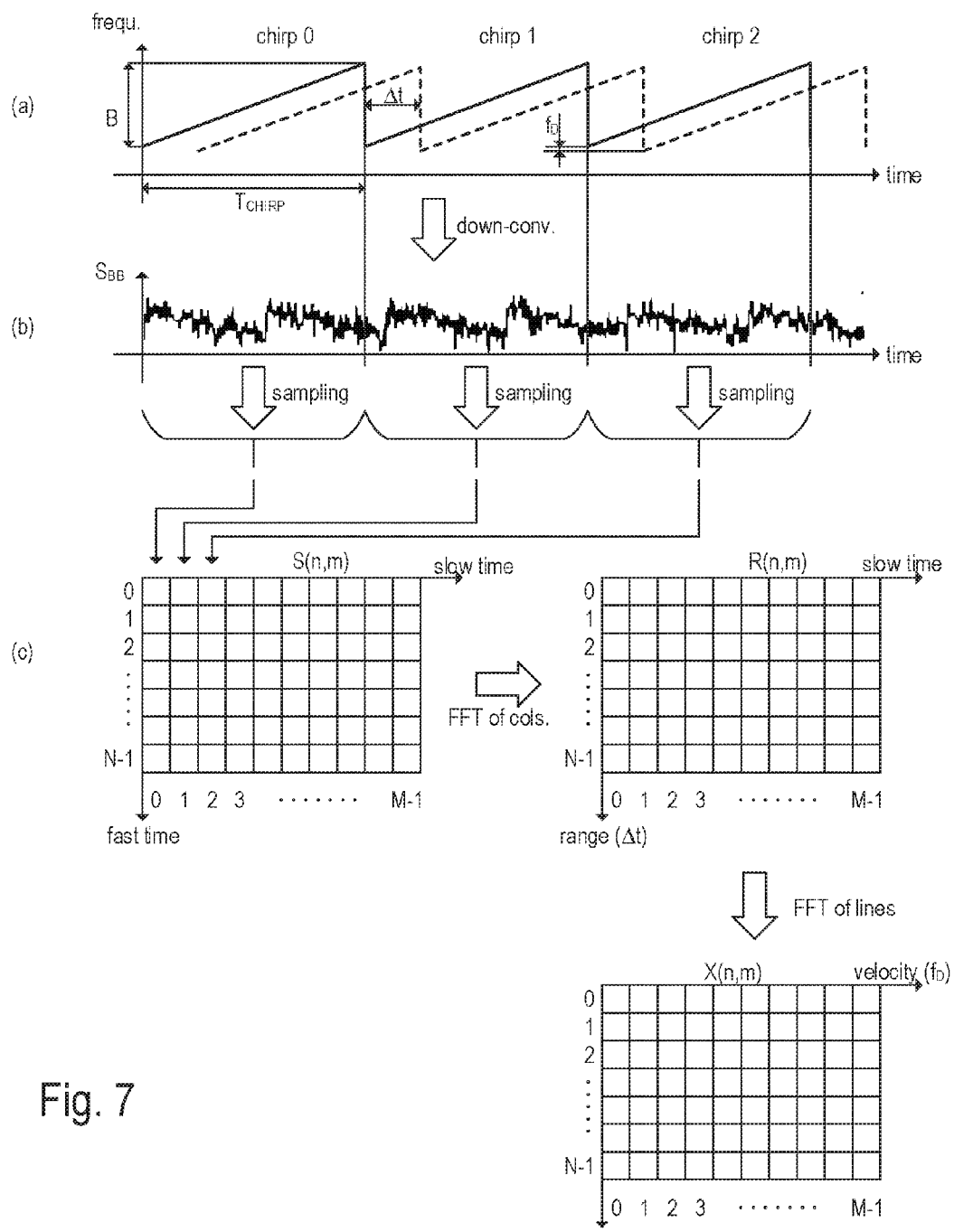
FIG. 7 includes diagrams that schematically illustrate Range-Doppler processing of FMCW radar signals.

The Range-Doppler Processing is schematically illustrated in FIG. 7. The first diagram (diagram a) of FIG. 7 illustrates a sequence of chirps similar as in FIG. 3. The solid line represents the transmitted chirps and the dashed lines the corresponding radar echo (e.g. signal $S_{RX}'$ in the example of FIG. 1 or 2). The second diagram (diagram b) of FIG. 7 illustrates the down-converted base-band signal, e.g. signal $S_{BB}'$ in the example of FIG. 1 or 2. This signal is digitized (i.e. sampled and quantized), wherein the sampling time is chosen such that each chirp is represented by N samples. Thus, when M subsequent chirps are digitized (precisely speaking, the resulting base-band signal is digitized), a number of N times M samples are obtained, which can be arranged in a N×M matrix S(n, m) as shown in the third diagram of FIG. 7 (diagram c). In the example of FIG. 7, diagram c, the index n denoting the line number of the matrix (n=0, 1, 2, . . . , N−1) can be regarded as fast time index (temporal distance between two subsequent samples along the individual columns is $T_{CHIRP}/N$), wherein the index m denoting the column number of the matrix (m=0, 1, 2, . . . , M−1) can be regarded as slow time index (temporal distance between two subsequent samples along the individual lines is $T_{CHIRP}$). The Range-Doppler map X(n, m)

may be obtained by applying a first FFT along the time axis (resulting in the Range-Time map R(n, m) that includes range information) and subsequently a second FFT along the slow time axis (resulting in the Range-Doppler map X(n, m)). That is, first an FFT is calculated for each column and, second, a FFT is calculated for each line of the matrix shown in FIG. 7.

Figure 8:
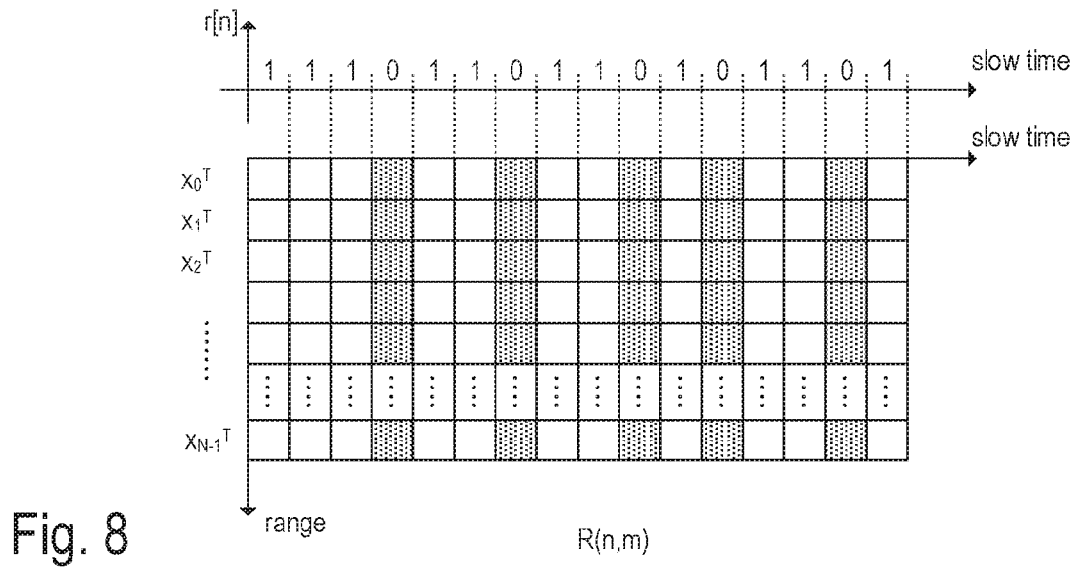
FIGS. 8 and 9 illustrate the arrangement of measured sample values in a sparse matrix for Range-Doppler processing.

One specific aspect of the embodiments described herein is that, when chirps are omitted as described above with reference to FIGS. 5 and 6, the resulting Range-Time maps R(m, n) will be sparse matrices. As the chirps are omitted in a random manner, the non-zero matrix elements are randomly distributed and the above-mentioned signal recovery algorithms may be applied (e.g. Orthogonal Matching Pursuit, OMP). As explained above with reference to FIGS. 5 and 6 some chirps are omitted in the transmitter, e.g., in a pseudo-random manner (cf. FIG. 6, random number generator 34). That is, only K chirps out of a sequence of M chirps are actually transmitted to and backscattered by the radar echo (K<M). Thus, only K chirps can be digitized and processed to form the Range-Time Map R(n, m) shown in FIG. 7, diagram c, and M−K columns of the M columns in the matrices S(n, m) and R(n, m) in FIG. 8, diagram c, contain only zeros. FIG. 8 shows the situation for the random sequence r[m], which has also been used in the example of FIG. 3. The gray-shaded columns of the Range-Time map R(n, m) include only zero elements as the respective chirps have been omitted in the transmitter.

As shown in FIG. 8, the matrix R(n, m) is composed of N line vectors $x_n^T$, wherein n=0, 1, 2, ... N−1 and T denotes the transpose operator, that is $$R(n, m) = \begin{bmatrix} x_{0,0} & \cdots & x_{0,M-1} \\ \vdots & \ddots & \vdots \\ x_{N-1,0} & \cdots & x_{N-1,M-1} \end{bmatrix} = \begin{bmatrix} x_0^T \\ \vdots \\ x_{N-1}^T \end{bmatrix}. \quad (2)$$

Figure 9:
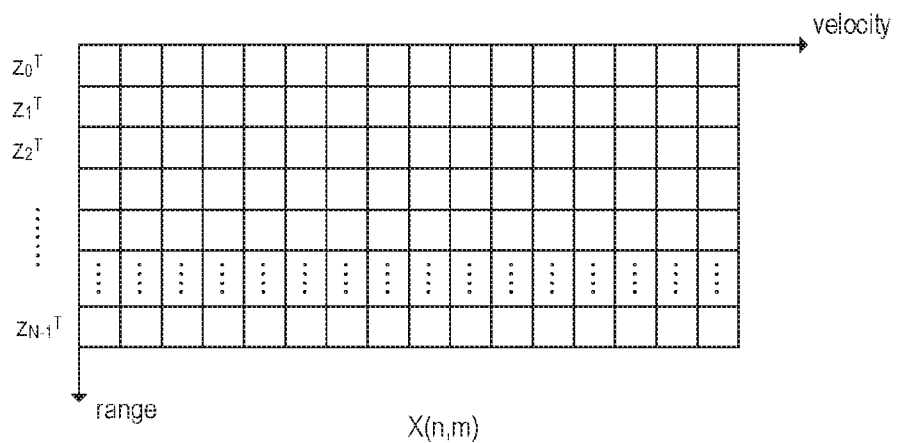

Each vector $x_n$ includes M elements but only K non-zero elements (and thus J=M−K zero elements). Accordingly, the non-zero elements of the vectors $x_n$ may be written in corresponding non-sparse vectors $y_n$ that are composed of the K non-zero elements, that is $$\tilde{R}(n, m) = \begin{bmatrix} y_{0,0} & \cdots & y_{0,K-1} \\ \vdots & \ddots & \vdots \\ y_{N-1,0} & \cdots & x_{N-1,K-1} \end{bmatrix} = \begin{bmatrix} y_0^T \\ \vdots \\ y_{N-1}^T \end{bmatrix}, \quad (3)$$

wherein $\tilde{R}(n, m)$ may be regarded as "compressed" Range-Time map, which represents the Range-Time map R(m,n) without zero columns. The vectors $x_n$ (composed of M elements $x_{n,0}, \ldots, x_{n,M-1}$) and $y_n$ (composed of K elements $y_{n,0}, \ldots, y_{n,K-1}$) are related by the following equation:

$$y_n = \Phi \cdot x_n, \quad (4)$$

wherein $\Phi$ is a K×M pseudorandom sparse matrix (K lines, M columns) representing the pseudorandom sequence r[m] mentioned above (see FIGS. 5 and 8). Equation 4 may be expressed as $$y_n = \Phi \cdot \{z_n\} = \Phi \cdot \Psi \cdot z_n, \quad (5)$$

wherein $z_n$ is the vector (composed of M elements $z_{n,m}$) including the Fourier transform of vector $x_n$ and $\Psi$ is a M×M matrix representing the Inverse Fast Fourier Transform (IFFT). Other types of transforms may be used instead of an IFFT in equation 5. However, considering IFFT is sufficient for the present discussion. The N line vectors $z_n^T$ (n=0, 1, 2, ... N−1) compose the sought Range-Doppler map X(n,m) as shown in FIG. 9, that is $$X(n, m) = \begin{bmatrix} z_{0,0} & \cdots & z_{0,M-1} \\ \vdots & \ddots & \vdots \\ z_{N-1,0} & \cdots & z_{N-1,M-1} \end{bmatrix} = \begin{bmatrix} z_0^T \\ \vdots \\ z_{N-1}^T \end{bmatrix}. \quad (6)$$

The signal recovery may thus performed using the following signal model:

$$y_n = A \cdot z_n + e_n \quad (7)$$

wherein $A = \Phi \cdot \Psi$ is a K×M sparse matrix, $y_n$ denotes the vectors including the non-zero elements within each of the N lines of the Range-Time Map R(n, m), $z_n$ denotes the vectors which form the N lines of the sought Range-Doppler map X(n, m), and $e_n$ denotes the corresponding measurement errors. The vectors $y_n$ on the left hand side of equation 7 form the "compressed" Range-Doppler map $\tilde{R}(n, m)$ (see equation 3), which is obtained from measurements as illustrated in FIG. 7 (diagrams a to c), wherein only K (instead of M) chirps are sampled (as M−K chirps are omitted). The vectors $z_n$ on the right hand side of equation 7 form the sought Range-Doppler map X(n,m) (see equation 6) as illustrated in FIG. 9. In essence, equation 7 represents N underdetermined equation systems (i.e. $y_n = A \cdot z_n$, n=0, 2, ..., N−1), wherein each equation system is composed of K equations with M (M>K) unknown variables (i.e. $z_{n,0}, z_{n,0}, \ldots, z_{n,M-1}$). These unknown equation systems may be solved using optimization algorithms which are as such known and which aim at a minimization of the residual error $e_n$. Dependent on the optimization algorithm, the residual error may be evaluated using different norms. As mentioned above, many of these algorithms make use of so-called $l_1$ optimization or $L_1$ optimization, which may be used to "reconstruct" the full (non-sparse) vectors $z_n$.

Using the signal model of equation 7 allows the reconstruction of vectors $z_n$ based on the "observations" $y_n$ (each of the N vectors $y_0, \ldots, y_{N-1}$ includes K samples), which are basically the Fourier transforms of the sampled radar echo (see FIGS. 1 and 2, radar echo $S_{RXDIG}$). One exemplary algorithm, which may be used for calculating $z_n$ (and thus the Range-Doppler map X(n,m)) from the measured samples included in $y_n$, is provided in: T. Tony Cai, Lie Wang, *Orthogonal Matching Pursuit for Sparse Signal Recovery With Noise, in: IEEE Trans. on Information Theory*, vol. 57, no. 7, July 2011. Once the full (non-sparse) Range-Doppler map X(n,m) has been reconstructed, any known technique for detecting radar targets based on Range-Doppler maps may be used.

Below some aspects of the embodiments are summarized. It is emphasized, however, that the following is not an exhaustive enumeration of features but is to be regarded as an exemplary summary of features which may be advantageous in at least one embodiment. Reference signs refer to FIGS. 1 to 9. Accordingly, transmitter circuit for a FMCW radar sensor is described (see, for example, FIG. 6). The transmitter includes RF oscillator (local oscillator 11) that is configured to generate a frequency-modulated RF transmit signal (e.g. LO signal $S_{LO}$). The RF transmit signal is composed of at least one sequence of consecutive chirp pulses, in which randomly selected chirps pulses are blanked (see FIG. 5, diagrams b and c). The chirp pulses may be randomly selected based on a pseudo-random sequence (i.e. a sequence of random numbers), and the pseudo-random sequence may be stored in a memory or be generated by a random number generator. The random sequence may be fixed (i.e. does not change during operation of the transmitter) or may be regularly varied. The transmitter may include a controller circuit (see, for example, FIG. 6, controller 31), which is coupled to the RF oscillator and configured to blank the randomly selected chirp pulses. In one particular embodiment, the controller circuit may be configured to enable and disable the RF oscillator (see, for example, FIG. 6, LO 11) in order to blank the randomly selected chirp pulses.

An antenna (see, for example, FIG. 2 antenna 20) may be coupled to the RF oscillator (e.g. via an RF amplifier) to radiate the RF transmit signal as radar signal (see, for example, FIG. 6, radar signal $S_{TX}$). In one specific embodiment, the controller circuit (see, for example, FIG. 6, controller 31), may be configured to enable and disable the RF amplifier (instead of the RF oscillator) in order to blank the randomly selected chirps pulses in the RF transmit signal. To generate the chirp pulses the RF oscillator may have a frequency control input for receiving a modulation signal, wherein the frequency of the RF transmit signal is modulated in response to the modulation signal (see FIG. 5, frequency ramps in diagrams a and c).

Moreover, a method for an FMCW radar device is described herein. According to one embodiment, the method includes the generation of an RF transmit signal composed of at least one sequence of chirp pulses, wherein randomly selected chirp pulses are blanked (see, for example, FIG. 5, diagrams b and c, and FIG. 6, RF transmit signal $S_{LO}$). The RF transmit signal is radiated via at least one antenna as radar signal (see, for example, FIG. 6, transmitted radar signal $S_{TX}$). As mentioned above, the RF transmit signal may be amplified before being radiated by the at least one antenna (see, for example, FIG. 2 antenna 20). The at least one sequence of chirp pulses is composed of M consecutive chirp pulses, wherein M−K chirp pulses are omitted so that K chirp pulses are radiated as radar signal (see, for example, FIG. 8, in which M−K of M elements are zero in each line of the Range-Time map R(n,m)). In some embodiments, at least one third of the chirp pulses may be omitted, i.e. the ratio (M−K)/M may be at least 1/3. In some embodiments the ratio (M−K)/M may up to 2/3 or even more.

In one embodiment, the method further comprises receiving a radar echo signal, which is the portion of the radar signal that is back-scattered at a radar target located in the radar channel. Consequently, the radar echo signal includes the chirp pulses of the radiated radar signal (see, for example, FIG. 7, dashed lines in diagram a). One exemplary implementation of the receive signal path of a radar transmitter is shown in FIG. 1, wherein the amplified radar echo signal is denoted as $S_{RX}'$. The radar echo signal is down-converted from an RF band into a base-band or IF-band (see, for example, FIG. 1, mixer 10). Subsequently, the down-converted radar echo signal may be digitized to obtain a digital signal for each chirp pulse included in the radar echo signal, wherein each digital signal is composed of N samples (see, for example, FIG. 7, diagram a, K non-zero digital signals in M columns of Matrix S(n,m), each of the K digital signals is composed of N samples). In one embodiment the method includes the transformation of the K non-zero digital signals into the frequency domain (see, for example, FIG. 7, diagram c). The result of this transformation may be represented by the Range-Time map R(n, m) shown, for example, in FIG. 8. Only K columns of the Range-Time map R(n, m) include non-zero values.

To reconstruct the "missing" information (due to the zero columns in the Range-Time map R(n, m), a underdetermined equation systems may be determined (see, for example, equation 7). In the described case, in which each of the K digital signals is composed of N samples, N equation systems may be determined based on the K digitals signals (see, for example, FIG. 8, columns of R(m, n)) and a matrix, which includes information about which of the M consecutive chirp pulses have been omitted (see equations 4 to 7, matrix $A=\Phi \cdot \Psi$, wherein $\Psi$ represents the pseudorandom sequence). A solution of each underdetermined equation system may be approximated using an optimization algorithm, wherein the optimization algorithm may be configured to minimize a norm of residual errors.

In accordance with another example, the method includes generating an RF transmit signal composed of at least one sequence of chirp pulses, wherein randomly selected chirp pulses are blanked, and radiating the RF transmit signal via at least one antenna as radar signal. A portion of the radar signal, which is back-scattered at a radar target, is received as radar echo signal, which includes the chirp pulses of the radiated radar signal. Then the radar echo signal is down-converted from an RF band into a base-band or IF-band, and the down-converted radar echo signal is digitized to obtain a digital signal for each chirp pulse included in the radar echo signal. This method further includes calculating a Range-Doppler map based on the digital signals. Again, the sequence of chirp pulses may be composed of M consecutive chirp pulses, wherein only K out of the M consecutive chirp pulses are not blanked and thus included in the radiated radar signal. Thus, the digitizing of the down-converted radar echo signal yields K digital signals corresponding to K chirp pulses included in the radar echo signal, wherein each of the K digital signals being composed of N samples. Finally, a Range-Doppler map composed of N times M samples may be calculated based on the K digital signals as described above with reference to FIGS. 5 to 9.

While various embodiments of the invention have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

We claim:

1. A transmitter circuit for a FMCW radar sensor, the transmitter circuit comprising:
   an RF oscillator that operably generates a frequency-modulated RF transmit signal;
   wherein the RF transmit signal is composed of at least one chirp sequence,
   wherein each chirp sequence includes a defined number of consecutive chirp pulses having a defined pulse length,
   wherein, in each chirp sequence, randomly selected chirp pulses are omitted.

2. The transmitter circuit of claim 1,
wherein the randomly selected chirp pulses are selected based on a pseudo-random sequence.

3. The transmitter circuit of claim 1,
wherein the pseudo-random sequence is stored in a memory or is generated by a random number generator.

4. The transmitter of claim 1 further comprising:
a controller circuit coupled to the RF oscillator and configured to omit the randomly selected chirp pulses by blanking.

5. The transmitter circuit of claim 1 further comprising:
a controller circuit coupled to the RF oscillator and configured to enable and disable the RF oscillator in order to omit the randomly selected chirp pulses,
wherein the randomly selected chirp pulses are selected based on a pseudo-random sequence.

6. The transmitter circuit of claim 5,
wherein the pseudo-random sequence is fixed or
wherein the pseudo-random sequence is regularly varied.

7. The transmitter circuit of claim 1 further comprising:
an antenna coupled to the RF oscillator to radiate the RF transmit signal as radar signal.

8. The transmitter circuit of claim 1 further comprising:
an RF amplifier coupled to the RF oscillator to amplify the RF transmit signal; and
an antenna coupled to the RF amplifier to radiate the amplified RF transmit signal as radar signal.

9. The transmitter circuit of claim 8, further comprising
a controller circuit configured to enable and disable the RF oscillator or the RF amplifier to blank the randomly selected chirps pulses.

10. The transmitter circuit of claim 1,
wherein the RF oscillator comprises a frequency control input for receiving a modulation signal; a frequency of the RF transmit signal being modulated in response to the modulation signal.

11. A method for an FMCW radar device, the method comprising:
generating an RF transmit signal composed of at least one chirp sequence each chirp sequence including a defined number of consecutive chirp pulses having a defined pulse length,
wherein, in each chirp sequence, randomly selected chirp pulses are omitted;
radiating the RF transmit signal via at least one antenna as radar signal.

12. The method of claim 11, wherein the RF transmit signal is amplified before being radiated by the at least one antenna.

13. The method of claim 11,
wherein the at least one chirp sequence is composed of M consecutive chirp pulses, wherein M−K chirp pulses are omitted so that K chirp pulses are radiated as radar signal.

14. The method of claim 13,
wherein the ratio (M−K)/M is at least 1/3.

15. The method of claim 11,
wherein the chirp pulses to be omitted are randomly selected in accordance with a sequence of random numbers.

16. The method of claim 15,
wherein the sequence of random numbers is fixed or
wherein the sequence of random numbers is varied regularly.

17. The method of claim 15,
wherein the sequence of random numbers is stored in a memory or
wherein the sequence of random numbers is generated by a pseudo-random generator.

18. The method of claim 11, wherein
receiving, as radar echo signal, a portion of the radar signal, which is back-scattered at a radar target, the radar echo signal including an echo of the chirp pulses of the radiated radar signal; and
down-converting the radar echo signal from an RF band into a base-band or IF-band.

19. The method of claim 18 further comprising
digitizing the down-converted radar echo signal to obtain a digital signal for each chirp pulse echo included in the radar echo signal.

20. The method of claim 19,
wherein each digital signal is composed of N samples.

21. The method of claim 19, further comprising
transforming the digital signals into the frequency domain.

22. The method of claim 19,
wherein the at least one chirp sequence is composed of M consecutive chirp pulses, wherein M−K chirp pulses are omitted so that K chirp pulses are radiated as radar signal; and
wherein K digital signals are obtained representing the radar echo of the K chirp pulses in the base-band or IF-band.

23. The method of claim 22 further comprising:
determining an underdetermined equation system based on the K digital signals and a matrix, which includes information about which of the M consecutive chirp pulses have been omitted.

24. The method of claim 23 further comprising:
solving the underdetermined equation system using an optimization algorithm.

25. The method of claim 23,
wherein the optimization algorithm is configured to minimize a norm of residual errors.

26. A method for an FMCW radar device, the method comprising:
generating an RF transmit signal composed of at least one chirp sequence, each chirp sequence including a defined number of consecutive chirp pulses having a defined pulse length,
wherein, in each chirp sequence, randomly selected chirp pulses are omitted;
radiating the RF transmit signal via at least one antenna as radar signal;
receiving, as radar echo signal, a portion of the radar signal, which is back-scattered at a radar target, the radar echo signal including an echo of the chirp pulses of the radiated radar signal; and
down-converting the radar echo signal from an RF band into a base-band or IF-band and digitizing the down-converted radar echo signal to obtain a digital signal for each chirp pulse included in the radar echo signal; and
calculating a Range-Doppler map based on the digital signals.

27. The method of claim 26,
wherein the sequence of chirp pulses is composed of M consecutive chirp pulses, wherein only K out of the M consecutive chirp pulses are not omitted and thus included in the radiated radar signal; and
wherein the digitizing of the down-converted radar echo signal yields K digital signals corresponding to K chirp pulses included in the radar echo signal, each of the K digital signals being composed of N samples.

28. The method of claim 27, further comprising calculating a Range-Doppler map composed of N times M samples based on the K digital signals.

\* \* \* \* \*